United States Patent
Tennevall et al.

(10) Patent No.: US 10,436,107 B2
(45) Date of Patent: Oct. 8, 2019

(54) EXHAUST GAS PRESSURE REGULATOR FOR A COMBUSTION ENGINE

(71) Applicant: VOLVO TRUCK CORPORATION, Göteborg (SE)

(72) Inventors: Peter Tennevall, Malmö (SE); Johan Persson, Skurup (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 53 days.

(21) Appl. No.: 15/569,798

(22) PCT Filed: May 29, 2015

(86) PCT No.: PCT/EP2015/061948
§ 371 (c)(1),
(2) Date: Oct. 27, 2017

(87) PCT Pub. No.: WO2016/192749
PCT Pub. Date: Dec. 8, 2016

(65) Prior Publication Data
US 2018/0135510 A1  May 17, 2018

(51) Int. Cl.
*F01N 13/08* (2010.01)
*F02B 37/00* (2006.01)
(Continued)

(52) U.S. Cl.
CPC .............. *F02B 37/24* (2013.01); *F01N 13/08* (2013.01); *F02B 37/004* (2013.01);
(Continued)

(58) Field of Classification Search
CPC .. F01N 13/08; F01N 2260/14; F01N 2260/16; F01N 2340/00; F01N 2470/08;
(Continued)

(56) References Cited

U.S. PATENT DOCUMENTS

| 3,865,128 A | 2/1975 | Zadoo |
| 4,283,912 A | 8/1981 | Cholvin |

(Continued)

FOREIGN PATENT DOCUMENTS

| CN | 1573057 A | 2/2005 |
| CN | 200955432 Y | 10/2007 |

(Continued)

OTHER PUBLICATIONS

International Search Report (dated Sep. 18, 2015) for corresponding International App. PCT/EP2015/061948.
(Continued)

*Primary Examiner* — Audrey K Bradley
*Assistant Examiner* — Dapinder Singh
(74) *Attorney, Agent, or Firm* — Venable LLP; Jeffri A. Kaminski (57) ABSTRACT

An exhaust gas pressure regulator for a combustion engine includes a regulator housing and an inner diffuser assembly arranged inside the regulator housing so that an exhaust gas flow duct is formed between an inner surface of the regulator housing and an outer surface of the inner diffuser assembly. The inner diffuser assembly includes a front portion and a regulating piston that is moveable relative to the front portion and the regulator housing between an idle position in which the exhaust gas flow duct is open, and a pressurized position in which the regulating piston at least partly closes the exhaust gas flow duct. The inner diffuser assembly includes at least one throttled flow passage between the gas flow duct and an exhaust gas pressure chamber defined by the regulating piston and an interior surface of the front portion.

22 Claims, 4 Drawing Sheets

(51) Int. Cl.
*F02D 9/06* (2006.01)
*F02B 37/24* (2006.01)
*F02B 37/013* (2006.01)
*F02B 37/18* (2006.01)
*F02B 37/22* (2006.01)
*F02D 9/12* (2006.01)

(52) U.S. Cl.
CPC .......... *F02B 37/005* (2013.01); *F02B 37/013* (2013.01); *F02B 37/183* (2013.01); *F02B 37/22* (2013.01); *F01N 2260/14* (2013.01); *F01N 2260/16* (2013.01); *F01N 2340/00* (2013.01); *F01N 2470/08* (2013.01); *F01N 2470/20* (2013.01); *F01N 2470/30* (2013.01); *F02D 9/06* (2013.01); *F02D 9/12* (2013.01); *Y02T 10/144* (2013.01); *Y02T 10/163* (2013.01)

(58) Field of Classification Search
CPC ............ F01N 2470/20; F01N 2470/30; F02B 37/004; F02B 37/005; F02B 37/013; F02B 37/183; F02B 37/22; F02B 37/24; F02D 9/06; F02D 9/12; Y02T 10/144; Y02T 10/163
USPC .......................................................... 60/602
See application file for complete search history.

(56) References Cited

U.S. PATENT DOCUMENTS

| | | | |
|---|---|---|---|
| 4,703,625 A * | 11/1987 | Caldwell | F02B 37/186 137/116.5 |
| 6,189,896 B1 | 2/2001 | Dickey et al. | |
| 8,695,336 B2 * | 4/2014 | Burkhard | F02D 41/0007 60/602 |
| 8,733,100 B2 * | 5/2014 | Christmann | F02M 26/58 60/602 |
| 9,447,697 B2 * | 9/2016 | Markyvech | F01D 17/105 |
| 2009/0217662 A1 | 9/2009 | Giselmo et al. | |

FOREIGN PATENT DOCUMENTS

| | | |
|---|---|---|
| CN | 101932800 A | 12/2010 |
| EP | 2610474 A1 | 7/2013 |
| WO | 2007061339 A1 | 5/2007 |
| WO | 2014154226 A1 | 10/2014 |
| WO | 2015077287 A1 | 5/2015 |

OTHER PUBLICATIONS

European Official Action (dated Jun. 18, 2019) from corresponding European App. 19167638.6.

* cited by examiner

EXHAUST GAS PRESSURE REGULATOR FOR A COMBUSTION ENGINE

BACKGROUND AND SUMMARY

The present invention relates to an exhaust gas pressure regulator for an engine. More particularly, the present invention relates to an exhaust gas pressure regulator having a moveable regulating member for controlling the exhaust gas through flow. Exhaust gas pressure regulators may be used for controlling a back-pressure in the exhaust system, thereby enabling controlled engine braking. The exhaust gas pressure regulator of the invention, can be implemented in the exhaust system for combustion engines configured to be installed in for example heavy-duty vehicles, such as trucks, buses, working machines and construction equipment, but also other types of vehicles, such automobiles.

Combustion engines, in particular piston engines, may be provided with an exhaust gas pressure regulator for allowing exhaust brake functionality. Generally, by restricting or prevention exhaust gas to flow out from the exhaust system the exhaust gas pressure upstream the exhaust gas pressure regulator will increase. As a result, the high-pressure exhaust gas within the exhaust system will generate a relatively large counter force on the top side of the pistons during the exhaust stroke of the piston, such that the combustion engine is forced to slow down.

US2009217662 describes an example of an exhaust gas pressure regulator having a moveable piston arranged in a diffuser duct for controlling the back-pressure in the exhaust system upstream of the regulator.

While the solutions found in the prior art work well in some situations, there is still room for improvements relating to the exhaust gas pressure regulator.

For accomplishing an engine braking effect by means of the gas pressure regulator shown in US2009217662, a regulating pressure source will be connected to an inner piston chamber for forcing a control piston towards its closed position. Upon closure of the control piston a built up pressure on a regulator inlet end will result in increased gas pressure upstream the piston. The pressure will more or less simultaneously increase also inside a chamber formed inside the cone due to the pressure equalising channel 50. The pressure increase will thus act on the piston and cause the piston to move back towards its open position. As a result, increased gas flow past the piston will occur, such that the pressure on the regulator inlet end will drop. Upon reduced gas pressure on the regulator inlet end a regulating pressure of the exhaust gas pressure regulator again will force the control piston towards its closed position. Such pressure variations will cause the control piston to move back and forth rapidly and the amplitude of the oscillations may become particularly large at those engine combustion frequencies that are associated with the resonance frequency of the control piston. One example problem caused by large amplitude oscillations of the control piston is damages to control piston and/or regulator housing caused by repeated impact between the control piston and regulator housing at the end stroke of the regulator piston. Moreover, the oscillation may cause impact between neighbouring laps of a spring coils, thereby resulting in a relaxation problem of the spring and finally fracture damages. Finally, if a dampening element is provided for dampen said impact, the dampening element itself may become damaged due to the large amplitude oscillations.

Consequently, it is desirable to provide an improved exhaust gas pressure regulator in terms of reliability and reduced risk for damages.

The exhaust gas pressure regulator according to an aspect of this disclosure is suitable for a combustion engine and comprises a regulator housing and an inner diffuser assembly arranged inside the regulator housing so that an exhaust gas flow duct is formed between an inner surface of the regulator housing and an outer surface of the inner diffuser assembly. The inner diffuser assembly includes a front portion and a regulating piston that is moveable relative to the front portion and the regulator housing between an idle position in which the exhaust gas flow duct is open, and a pressurized position in which the regulating piston at least partly closes the exhaust gas flow duct. The inner diffuser assembly comprises at least one throttled flow passage between the gas flow duct and an exhaust gas pressure chamber defined by the regulating piston and an interior surface of the front portion.

This set of features ensures that the pressure within the exhaust gas pressure chamber does not oscillate with the same amplitude as the pressure within the gas flow duct. Since part of the effective surface area of the regulating piston accessible by exhaust gas for exerting an axial force on the regulating piston towards the outlet of the regulating housing does no longer experience the high amplitude oscillations, i.e. the part of the regulating piston defining the exhaust gas pressure chamber, the amount of effective surface area of the regulating piston accessible by high amplitude oscillating exhaust gas for exerting an axial force on the regulating piston towards the outlet of the regulating housing is reduced.

In short, the regulating piston effective surface area which is affected by the large pressure oscillations is decreased, and since the axial force exerted on the regulating is proportional to the effective surface area, the oscillating force on the regulating piston is reduced. Thereby, there is less risk for high amplitude oscillations of the regulating piston, and consequently also less risk for damages to the regulating piston, the housing, the spring or and damper element.

Further advantages and advantageous features of the invention are disclosed in the following description.

According to one example aspect of the exhaust gas pressure regulator, the at least one throttled flow passage is configured to form a low-pass filter for stopping high-frequency pressure pulses from reaching the regulating piston 130, but allowing pass of low-frequency pressure pulsations. The low-pass filter enables the average pressure within the exhaust gas pressure chamber 132 to follow the average pressure of the exhaust gas within any of the exhaust gas duct 106.

According to a further example aspect of the exhaust gas pressure regulator, the front portion is stationary arranged in the regulator housing. A stationery front portion with an internally arranged regulating valve enables less effective surface area accessible by the high amplitude pressure oscillations in the exhaust gas stream, such that the regulating piston will less likely be damaged due to oscillating impacts against the regulating housing at the end positions.

According to a further example aspect of the exhaust gas pressure regulator, the at least one throttled flow passage is configured such that an average pressure level within the exhaust gas pressure chamber corresponds substantially to an average exhaust gas pressure level of the exhaust gas stream at an inlet to the throttled flow passage. With too little throttling effect of the throttled flow passage substantially no pressure averaging effect is obtained by the throttled flow passage, such that relatively large amplitude pressure oscillations will propagate into the exhaust gas pressure chamber and potentially cause the regulating piston to oscillate with high amplitude. With too high throttling effect an increase in backpressure at the inlet of the exhaust gas pressure regulator caused by a suddenly closed regulating piston may result in a relatively slow increase of the pressure within the exhaust gas pressure chamber, such that the regulating piston too slowly will reach its equilibrium position. This delay in reaching the equilibrium position might therefore generate excessive back pressure for a certain time period, such that the vehicle brake effect is higher than desired.

Moreover, with too high throttling effect it may also become difficult to quickly change the position of the regulating piston at all, such that a desired backpressure at the inlet of the exhaust gas pressure regulator may temporarily significantly deviate from the actual back pressure. Such deviation is undesirable because it implies that the engine braking system does not provide as much braking force as desired. Consequently, either the hydraulic braking system must temporarily compensate for lack of braking force by means of complex regulating systems, or the driver will experience an undesirable inconsistency between vehicle deceleration and brake pedal actuation.

According to a further example aspect of the exhaust gas pressure regulator, a total throttled flow passage of the diffuser assembly has a flow area in the range of 0.5-10 mm2, specifically in the range of 1-6 mm2, more specifically in the range of 2-4 mm2. These ranges are deemed appropriate for enabling a balance between risk for regulator damages and delay of engine brake performance at transient conditions.

According to a further example aspect of the exhaust gas pressure regulator the total throttled flow passage is configured such that a degree of pressure attenuation of the high frequency components of the dynamic pressure pulsations in the exhaust gas flow duct is at least −6 dB, specifically at least −10 dB, and more specifically at least −20 dB. As discussed above, too high attenuation may result in reduced consistency between desired braking performance and actually delivered engine braking performance, and too low attenuation may result in damages to the regulator. A −6 dB attenuation of the amplitude of the pressure pulsations in the exhaust gas stream means that the amplitude of the pressure pulsations in the exhaust gas pressure chamber is reduced by half. A −10 dB attenuation means that the amplitude of the pressure pulsations in the exhaust gas pressure chamber are reduced by about three times, and a −20 dB attenuation means that the amplitude of the pressure pulsations in the exhaust gas pressure chamber are reduced by ten times.

According to a further example aspect of the exhaust gas pressure regulator, the inner diffuser assembly comprises a sealing ring that is configured to at least partly seal a flow passage between the regulating piston and the front portion of the inner diffuser assembly so that the at least one throttled flow passage is provided by means of a calibrated flow leakage past the sealing ring. By using the existing sealing ring as throttled flow passage no significant modifications of the regulator must be performed for implementing the solution of the disclosure. The sealing ring also has the advantage of enabling easy calibration of the throttling capacity merely by selecting a specific sealing ring. For example, by using a split piston ring that is located in a groove, the flow passage past the sealing ring is easily adaptable by varying the gap between the ends of the split piston ring in assembled state.

According to a further example aspect of the exhaust gas pressure regulator, the sealing ring is a metal piston ring. See advantages mentioned above.

According to a further example aspect of the exhaust gas pressure regulator, the metal piston ring in a mounted state has a gap between the circumferential ends of the piston ring. See advantages mentioned above.

According to a further example aspect of the exhaust gas pressure regulator, a circumferential length of an arc-shaped gap between the circumferential ends of the piston ring is in the range of 2-50 mm, specifically in the range of 3-25 mm, and more specifically in the range of 5-20 mm. These ranges are deemed appropriate for enabling a balance between risk for regulator damages and delay of engine brake performance at transient conditions.

According to a further example aspect of the exhaust gas pressure regulator, the at least one throttled flow passage is provided by means of a calibrated flow leakage through at least one aperture in the front portion of the inner diffuser assembly facing the exhaust gas stream. As an alternative for using the sealing ring for calibrating the flow leakage, an separate flow passage may be provided in the front portion of the inner diffuser assembly facing the exhaust gas stream. The flow passage may be implemented in form of at least one aperture that enables pressure equilibration between the pressure within the gas flow duct and the pressure within the exhaust gas pressure chamber. The aperture may for example be provided by means of drilling a hole in the front portion of the inner diffuser.

According to a further example aspect of the exhaust gas pressure regulator, a total amount of effective surface area of the regulating piston accessible by exhaust gas in the exhaust gas flow duct for exerting an axial force on the regulating piston towards the outlet of the regulating housing is less than 75% of a total amount of effective surface area of the regulating piston accessible by exhaust gas within the exhaust gas pressure chamber for exerting an axial force on the regulating piston towards the outlet of the regulating housing, specifically less than 50%, and more specifically less than 30%. By having only a portion of the total amount of effective surface area of the regulating piston accessible by exhaust gas in the exhaust gas flow duct the axial force that may be exerted by the large amplitude pressure pulsations of the exhaust gas in the exhaust gas flow is reduced compared with a regulator design where the entire amount of effective surface area of the regulating piston is accessible by exhaust gas in the exhaust gas flow duct. Hence, by selecting a regulator design with a large amount of the total amount of effective surface area of the regulating piston located within the exhaust gas pressure chamber, only a small amount of the total amount of effective surface is still available, thereby enabling reduced problem caused by large amplitude pressure pulses in the exhaust gas of the exhaust gas flow duct.

According to a further example aspect of the exhaust gas pressure regulator, the exhaust gas pressure regulator further comprises a control pressure chamber defined by the regulating piston, a nozzle unit and the shaft, wherein a pressurised medium within the control pressure chamber is arranged to exert a force on the regulating piston towards the pressurized position. This arrangement enables a reliable and cost-efficient control of the regulating position of the regulator piston.

According to a further example aspect of the exhaust gas pressure regulator, the pressure regulator further comprises a pressure medium flow passage for supplying pressurised medium from an outside pressure medium source to the control pressure chamber. Thereby, the regulating position of the regulator piston may be controlled by an externally arranged control unit, a pressure medium source and a suitable valve arrangement.

According to a further example aspect of the exhaust gas pressure regulator, the front portion of the inner diffuser assembly has a closed end facing an exhaust gas flow inlet of the exhaust gas pressure regulator, and an open end facing an exhaust gas outlet of the exhaust gas pressure regulator, wherein an annular damping member is provided between an axial abutment surface of the regulating piston and an opposite axial abutment surface of the front portion of the inner diffuser assembly for damping impact forces between the regulating piston and the front portion of the inner diffuser assembly. The annular damping member serves to dampen the impact of the regulating piston with the front portion of the inner diffuser assembly. Thereby the impact force may be reduced, and if damages occur it is less costly to change a damaged seaming member than changing the regulating piston and/or the regulator housing. The annular damping member may be located in either the regulating piston or the front portion of the inner diffuser assembly.

According to a further example aspect of the exhaust gas pressure regulator, front portion of the inner diffuser assembly has a conical shape with a generally increasing outer diameter in the axial direction from the closed end towards to the open end, and the opposite axial abutment surface of the front portion of the inner diffuser assembly is located in a radially outer region located near or at the open end. By providing the abutment surface relatively far out from a centre axis of the housing, in a radial direction, a relatively large abutment surface of the annular damping element is provided for a certain damping element width, because the area of the abutment surface is $A=\pi(r_o^2-r_i^2)$, where or corresponds to the outer radius of the annular damping element and rig corresponds to the inner radius of the annular damping element.

According to a further example aspect of the exhaust gas pressure regulator, the annular damping element is a metal textile bushing. This type of material is sufficiently heat resistant for being located in the exhaust pressure regulator.

According to a further example aspect of the exhaust gas pressure regulator, both an internal cross-sectional area defined by the inner surface of a regulator housing and an outer diameter of the inner diffuser assembly increases in an axial direction towards an outlet of the exhaust gas pressure regulator, and the diffuser assembly is arranged concentrically inside the inner surface of a regulator housing. The shape of the regulator housing is in particular suitable for being placed upstream of the rotor of an axial turbine because the exhaust gas flow is modified for hitting the blades of the axial turbine.

According to a further example aspect of the exhaust gas pressure regulator, the regulating piston is urged towards the idle position by the force of a mechanical spring device. Thereby, it is ensured that the regulating piston does not accidentally close the flow path of the exhaust gas flow.

According to a further example aspect of the exhaust gas pressure regulator, the regulating piston comprises a sleeve portion in sliding contact with an exterior side of the front portion of the inner diffuser assembly, and the sleeve portion protrudes into the exhaust gas flow duct when the regulating piston is in the pressurized position for at least partly closing the exhaust gas flow duct. Using the sleeve portion for closing the flow path of the exhaust gas flow in the exhaust gas flow duct has the advantage of reducing the effective surface area of the regulating piston that may generate an axial force on the regulating piston towards the closed position. Thereby, any large amplitude pressure pulses within the exhaust gas flow in the exhaust gas flow duct will not transmit any large forces for moving the regulating piston in the axial direction.

According to a further example aspect of the exhaust gas pressure regulator, the diffuser assembly comprises a stationary shaft, and the regulator piston is slidingly arranged on the shaft. This arrangement enables a robust design of the gas pressure regulator.

The disclosure further includes an exhaust gas system for an internal combustion engine comprising a gas pressure regulator as described above located downstream of a first turbine unit and upstream of a second turbine unit.

According to an example aspect of the exhaust gas system, the diffuser assembly forms a nozzle for the second turbine unit.

According to a further example aspect of the exhaust gas system, the second turbine unit is a turbo-compound unit.

According to a further example aspect of the exhaust, gas system, the first turbine unit is a turbo-charger unit.

The disclosure further includes a combustion engine comprising an exhaust gas system as described above.

The disclosure further includes a vehicle comprising a combustion engine as described above.

BRIEF DESCRIPTION OF THE DRAWINGS

With reference to the appended drawings, below follows a more detailed description of embodiments of the invention cited as examples.

In the drawings.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
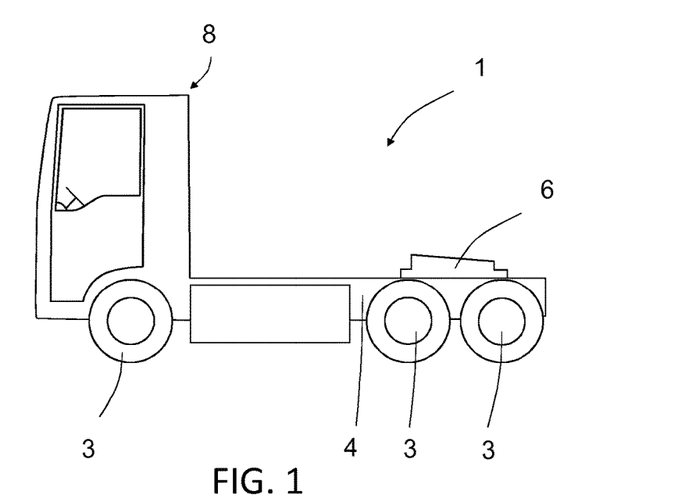
FIG. 1 shows an example vehicle suitable for having a combustion engine with an exhaust gas pressure regulator according to the disclosure.

With reference to FIG. 1, the disclosure concerns an exhaust gas pressure regulator for a combustion engine, wherein the combustion engine for example may be located in a vehicle such as a truck 1 for pulling a trailer. The truck typically comprises a chassis 4, front and rear wheels 3, a driver's cabin 8 and connector device 6 for connecting a trailer vehicle to the truck 1. The combustion engine may however alternatively be installed in other types of vehicles, such as buses, construction machinery, or the like.

Figure 2:
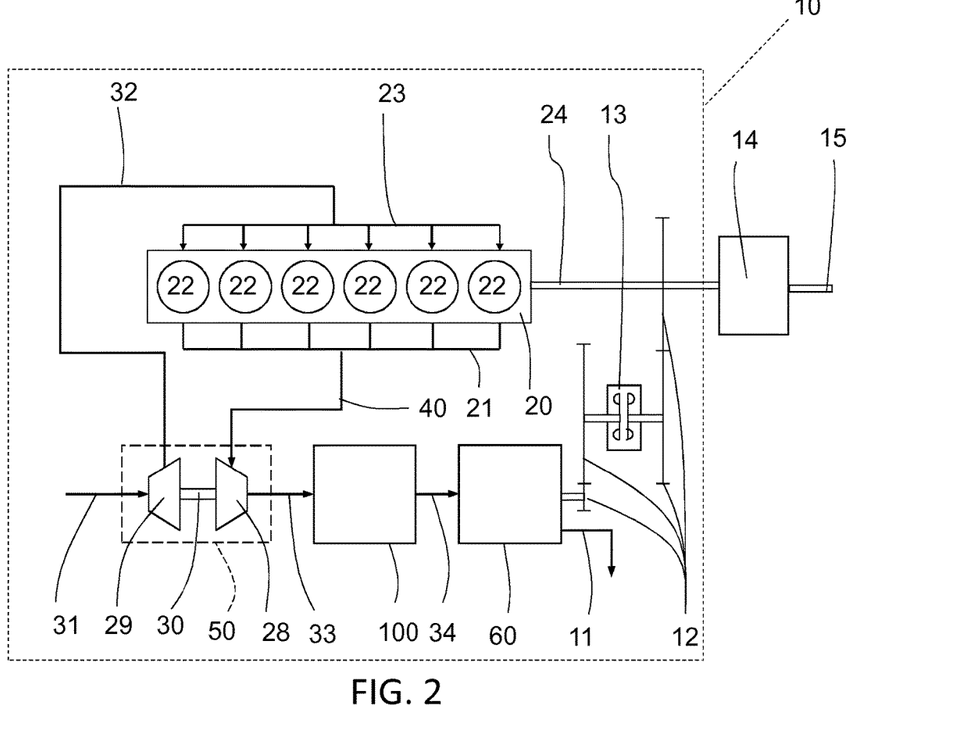
FIG. 2 shows an example embodiment of an combustion engine having an exhaust gas pressure regulator according to the disclosure.

FIG. 2 schematically shows an example embodiment of piston engine 10 having the exhaust gas pressure regulator according to the disclosure. The piston engine 10 includes an engine block 20 with six cylinders 22, which are in fluid communication with an air intake manifold 23 and an exhaust manifold 21. The engine further comprises a turbocharger unit 50 for increasing the output power of the combustion engine 1, as is well-known to the person skilled in the art of combustion engines. Hot exhaust gas having high-speed and high-pressure flows from the cylinders 22 via the exhaust manifold 21 and exhaust pipe 40 to a turbine wheel 28 of the turbo charger unit 50 and forces the turbine wheel 28 to rotate with a high speed. Exhaust air is subsequently conveyed via a regulator inlet pipe 33 to an exhaust gas pressure regulator 100 and turbo compound unit 60. The turbine wheel 28 of the turbo charger unit 27 is rotationally connected to an air intake compressor wheel 29 of the turbo charger unit 27 via a turbine shaft 30. The compressor wheel 29 compresses air that is sucked into turbo charger unit 27 via an inlet passage 31 and forwards the charge air to the intake manifold 23 via an inlet pipe 32.

The turbo compound unit 60 provides an additional torque to a crankshaft 24 of the engine 10. An exhaust gas pressure regulator 100 is arranged between the turbo-charger unit 50 and the turbo-compound unit 60.

Before turning to particular details of the exhaust gas pressure regulator 100, some general comments on the functionality of the present embodiment will be given. As exhaust gas is flowing out from the engine block 20, the energy of the exhaust gas will be used in the turbo-charger unit 50 for compressing the air before it is introduced in the cylinders 22. The exhaust gas will thereafter flow through the exhaust gas pressure regulator 100 which in its idle position serves to diffuse the exhaust gas flow before it flows through the turbo-compound unit 60. A part of the remaining energy of the exhaust gas flowing out from the exhaust gas pressure regulator 100 will cause a turbine of the turbo-compound unit 60 to rotate, which rotation is coupled to the crankshaft 24 via a transmission 12 and hydraulic convener 13, thus adding torque for driving the vehicle. The crankshaft 24 is subsequently connected to a transmission 14 for adapting gearing before transmitting output torque to the driving wheels via a power train output shaft 15. Further components, such as a catalytic converter and a silencer (not shown), are normally also provided in an exhaust pipe 11 located downstream of the turbo-compound unit 60 in order to form a complete exhaust system for the engine 10.

The exhaust gas pressure regulator 100 is controllable for adjusting the amount of exhaust gas flowing through. During normal operation the exhaust gas pressure regulator 100 is in its idle position whereby no restriction in the exhaust gas flow is provided. However, in some situations it is desirable to compress the exhaust gas exiting the cylinders, e.g. during braking or engine heat mode for increasing the temperature of the exhaust gas. If this is the case the exhaust gas pressure regulator changes its position into an operational position for at least partly blocking the exhaust gas flow.

Figure 3:
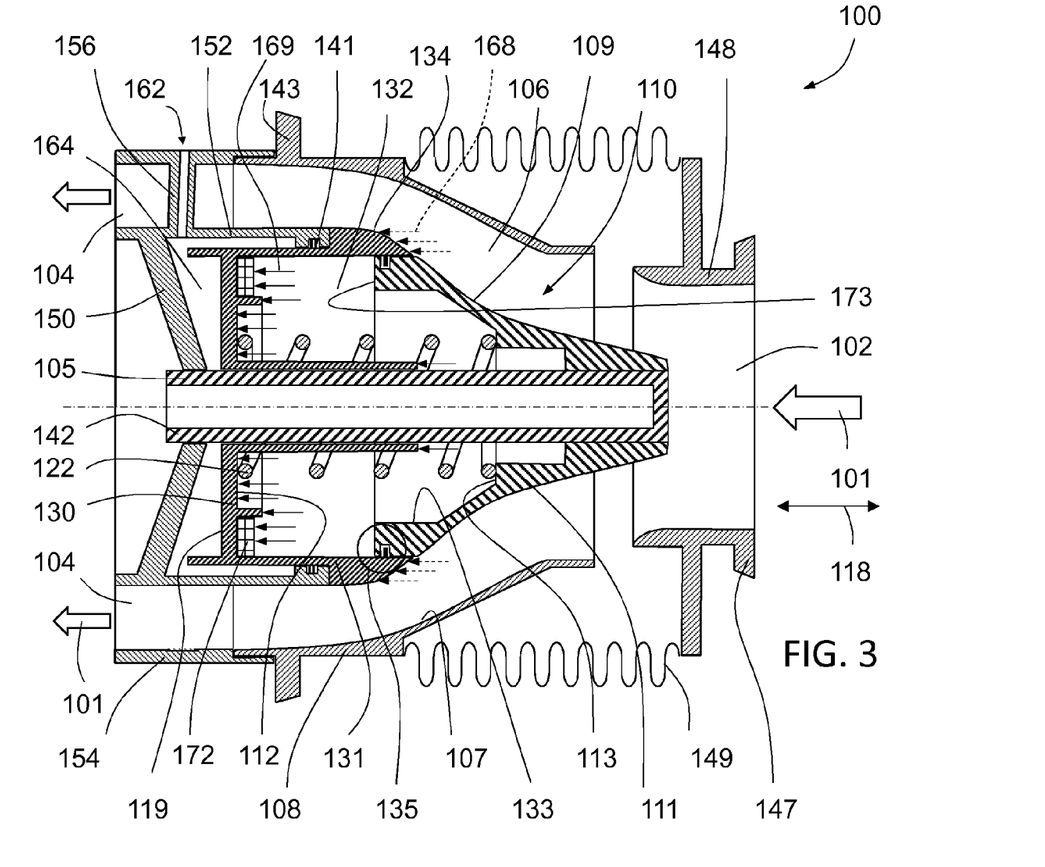
FIG. 3 shows a schematic example embodiment of an exhaust gas pressure regulator according to the disclosure.

Now turning to FIG. 3, which schematically shows an example embodiment of an exhaust gas pressure regulator 100 according to the disclosure. Exhaust gas is introduced at art inlet end 102 and flows through the pressure regulator to an outlet end 104. An exhaust gas flow duct 106 is formed between the inlet end 102 and the outlet end 104, which flow duct serves to diffuse the exhaust gas as will be further explained below. The exhaust gas flow duct 106 forms an annular conduit which has an outer periphery being defined by an inner surface 107 of the regulator housing 108 and, and an inner periphery being defined by an outer surface 109 of the inner diffuser assembly 110, which is arranged inside the arranged inside the regulator housing 108. Hence, the outer diameter of the inner diffuser assembly 110 is less than the inner diameter of the regulator housing 108, such that exhaust gas flows in the volume formed between these two components 108, 110, i.e. in the exhaust gas flow duct 106.

The regulator housing 108 has a longitudinal extension such that it extends in the same direction as an exhaust gas flow, i.e. from the inlet end 102 towards the outlet end 104. The diameter of the regulator housing 108 is preferably varying along its longitudinal direction, such that the cross-sectional area is increasing along the exhaust gas flow direction 101. Correspondingly, the inner diffuser assembly 110 has a longitudinal extension such that it extends in the same direction as the exhaust gas flow. The diameter of the inner diffuser assembly 110 may vary along its longitudinal direction such that the cross-sectional area is increasing along the exhaust gas flow.

The inner diffuser assembly 110 may thus have a conical shape, or a shape slightly deviating from a strict conical shape as indicated in FIG. 3 in which a bell shape is presented. Correspondingly, the regulator housing 108 may have a conical shape, or a shape slightly deviating from a strict conical shape as indicated in FIG. 3, in which a semi dome shape is shown.

The regulator housing 108 and the inner diffuser assembly 110 are preferably arranged such that the width of the annular gas flow duct 106 is substantially constant, or slightly increasing, along the longitudinal extension when the exhaust gas pressure regulator 100 is in its idle position. However, as the diameter of the regulator housing 108 and the diameter of the inner diffuser assembly 110 are increasing along the exhaust gas flow direction, the volume of the gas flow duct 106 will increase along the exhaust gas flow direction 101 whereby a diffusion of the exhaust gas will be provided.

The inner diffuser assembly 110 comprises a centrally arranged stationary shaft 105, a regulator piston 130 that is slidingly arranged on the shaft 105, and a conical front portion 111 stationary and permanently connected to the shaft 105.

The regulating piston 130 that is moveable relative to the front portion and the regulator housing between an idle position in which the exhaust gas flow duct is open, and a pressurized position in which the regulating piston at least partly closes the exhaust gas flow duct An outlet end 142 of the shaft 140 is fixedly attached to a nozzle unit 150 which forms the outlet end 104 of the exhaust gas pressure regulator 100. The nozzle unit 150 further includes a cylindrical portion 152 extending towards the inlet end 102. The cylindrical portion 152 is configured to slidingly support an outer surface of the regulating piston 130. Hence, the piston 130 is arranged coaxially on the shaft 105 and the outer periphery of the piston 130 is sealed against the cylindrical portion 152 of the nozzle unit 150 by means of a seal 141.

The nozzle unit 150 further has an outer portion 154, arranged radially outwards of said cylindrical portion 152 and forming a circumferential support structure surrounding the cylindrical portion 152. The outer portion 154 forms the outer portion of the outlet end 104 of the exhaust gas pressure regulator 100 and is connected to the regulator housing 108.

In the disclosed embodiment the regulator housing 108 includes an outer annular flange 143 that is configured be connect the exhaust gas pressure regulator 100 to an outlet pipe 34 located downstream of the regulator 100 or alternatively directly to an inlet portion of the turbo-compound unit 60. Alternatively, the flange may be provided on the outer portion 154 of the nozzle unit 150 instead.

In the disclosed embodiment the exhaust gas pressure regulator 100 further comprises an outer annular flange 147 that is configured to connect the exhaust gas pressure regulator 100 to an inlet pipe 33 located upstream of the regulator 100 or alternatively directly to an outlet portion of turbo-charger unit 50.

In the disclosed example embodiment of the exhaust gas pressure regulator 100 the outer annular flange 147 is provided on an individual part 148 of the exhaust gas pressure regulator 100, which individual part 148 is connected with the regulator housing 108 by means of a corrugated metal tube 149. This design enables a large degree of freedom in relative motion between the individual part 148 and regulator housing 108, and vibrations are largely prevented from being transferred between the regulator housing 108 and individual part 148. The regulator may thus comprise three individual parts forming the outer surface of the regulator 100, namely the individual part 148, a regulator housing 108 and a nozzle unit 150.

The regulating piston 130 is urged towards the idle position by the force of a mechanical spring 122, which is configured to abut an internal surface 113 of the conical front portion 111 and a first axial side surface 112 of the regulating piston 130.

The exhaust gas pressure regulator 100 further comprises a control pressure chamber 164 configured for receiving pressurised air or the like for controlling the position of the regulating piston in the axial direction 118, and thereby also the desired backpressure in gas flow duct 106 is attained. The control pressure chamber 164 is defined by a second axial side surface 119 of the regulating piston 130, a portion of the nozzle unit 150 that faces the second axial side surface 119 of the regulating piston, an inner surface of the cylindrical portion 152 of the nozzle unit 150, and an outer surface of the shaft 105.

One or more hollow connector elements 156 may be provided for connecting the outer portion 154 of the nozzle unit 150 with the inner diffuser assembly 110. The at least one hollow connector element 156 is arranged for allowing pressurized air to flow from a pressurised air source into the control pressure chamber 164 of the inner diffuser assembly 110. Feeding channels are thus arranged in one or n ore of the connector elements 156 for guiding the pressurized air into the closed cavity 164, but alternative solutions for feeding pressurized air icy the control pressure chamber are possible. When for example pressurized air is supplied via the air inlet 162, a force urging the piston 130 away from the idle position and towards a pressurized position will be generated.

When the exhaust regulator 100 is located upstream of turbo-compound unit 60 or a second turbo charger unit, the connector elements 156 may form guide vanes that are arranged to guide the exhaust flow into a desired flow direction.

The regulating piston 130 further comprises a sleeve portion 131 in sliding contact with an exterior side of the front portion 111 of the inner diffuser assembly 110. Thereby, an exhaust gas pressure chamber 132 is defined by the inner surface 133 of the substantially conical front portion 111, the first axial side surface 112 of the piston 130 and an outer surface of the shaft 105.

The regulating piston 130 is moveable relative to the front portion 111 and the regulator housing 108 between an idle position in which the exhaust gas flow duct 106 is open, and a pressurized position in which the regulating piston 130 at least partly closes the exhaust gas flow duct 106. The closing is performed by controlling the regulating to move towards its pressurized position, thereby rendering the sleeve portion 131 of the regulating piston 130 to move into the exhaust gas flow duct 106, such that the exhaust gas flow duct 106 becomes at least partly closed. The sleeve portion 131 may consequently be referred to as a valve sleeve, and the regulating control piston 130 can move axially for regulating the flow area of the exhaust gas flow duct 106 by means of the valve sleeve, against the effect of the helical compression spring 122.

A annular damping element 172 may be provided between an axial abutment surface of the regulating piston 130 and an opposite axial abutment surface 173 of the front portion 111 of the inner diffuser assembly 110 for damping impact forces between the regulating piston 130 and the front portion 111 of the inner diffuser assembly 110. The annular damping element 172 may be a metal textile bushing. An advantage of locating the annular damping element 172 at the radially outer portion of the front portion 111 a relatively large area of the annular damping element is accomplished, thereby reducing the impact stress on the damping element 172 and mating surfaces.

In the idle position of the regulating valve (see FIG. 3), a distal portion 134 of the sleeve portion 131 may be configured to form part of the outer surface 109 of the inner diffuser assembly 110. In the active control position (see FIG. 6), an inner wall surface of the sleeve portion 131 protrudes into the exhaust gas flow duct 106 between the front portion 111 and the cylindrical portion 152 of the nozzle unit 150.

The inner diffuser assembly 110 comprises at least one throttled flow passage 144 for enabling pressure equalization of the pressure within the gas flow duct 106 and the exhaust gas pressure chamber 132. In the embodiment of FIG. 3, the throttled flow passage 144 is formed by a passage at the location 135 of the sliding contact between the sleeve portion 131 and the exterior side of the front portion 111 of the inner diffuser assembly 110.

Thanks to the throttled flow passage 144 the pressure within the exhaust gas pressure chamber 132 is substantially static when the regulating piston is arranged in a fixed position.

Figure 4:
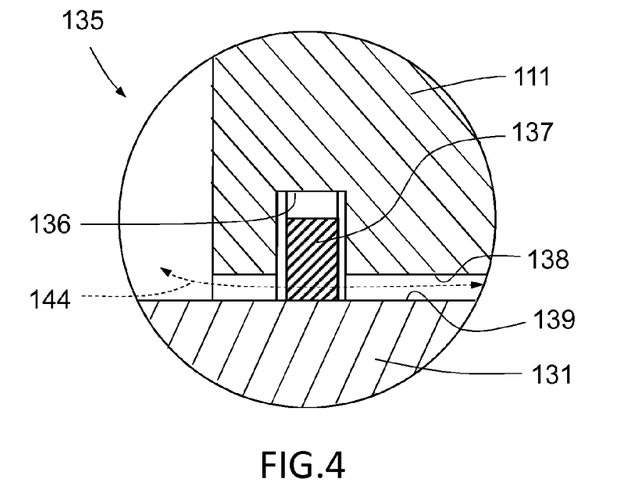
FIG. 4 shown a part of the exhaust gas pressure regulator of FIG. 3 in more detail.

With reference to FIG. 4, which corresponds to schematic magnification of the location 135 of the sliding contact, the exterior side of the front portion 111 of the inner diffuser assembly 110 comprises a groove 136, in which a sealing ring 137 is located. The dimensions of the front portion 111 of the inner diffuser assembly 110 and an interior side of the sleeve portion 131 are also selected such that a radial gap is also formed between an exterior side 138 of the front portion 111 and at interior side of the sleeve portion 131. The gap is part of the flow passage 144. The size of the gap is sufficient for enabling a leakage flow between the gas flow duct 106 and the exhaust gas pressure chamber 132. The total flow area resulting from the gap may be at least 50 mm2, specifically at least 100 mm2, or in the range of 50-1000 mm2.

Figure 5:
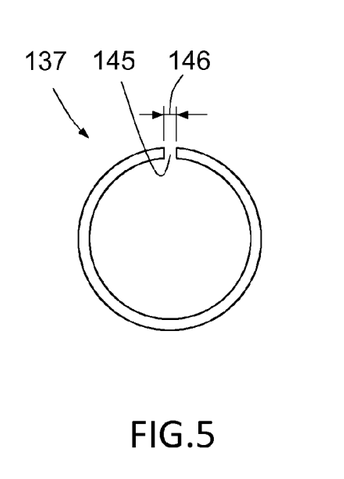
FIG. 5 shows an example embodiment of a sealing ring according to the disclosure.

According to one example embodiment, the sealing ring 137 may be configured to at least partly seal the flow passage 144 between the regulating piston and the front portion of the inner diffuser assembly so that the a the flow passage 144 is throttled. This partly sealing of the flow passage 144 may for example be performed by means of a calibrated flow leakage past the sealing ring 137. One example solution for accomplishing the calibrated flow leakage past the sealing ring 137 is to provide sealing ring in form of a piston ring that has an annular gap 145 between circumferential ends of the piston ring.

By selecting an appropriate circumferential length 146 of the arc-shaped gap between the circumferential ends of the piston ring it is possible to calibrate the level of flow leakage past the sealing ring. For example, the appropriate circumferential length 146 of the arc-shaped gap between the circumferential ends of the piston ring may be in the range of 2-50 mm, specifically in the range of 3-25 mm, and more specifically in the range of 5-20 mm.

Due to the provision of the flow passage 144 a pressure balancing of the exhaust gas pressure regulator 100 is achieved, so that this automatically adjusts itself by self-regulation.

Figure 6:
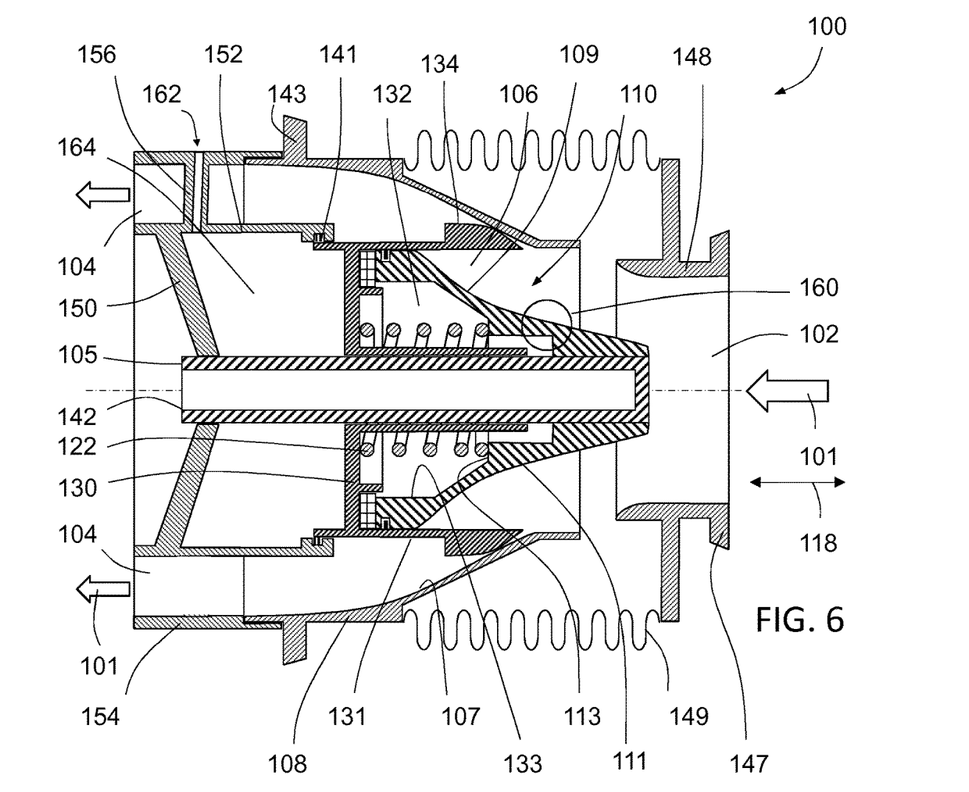
FIG. 6 shows the schematic example embodiment of an exhaust gas pressure regulator of FIG. 3 with the regulation piston in a pressurized state.

When the exhaust gas pressure regulator 100 is activated, i.e. when pressurized media is supplied to the control pressure chamber 164, the regulating control piston 130 begins to move axially against the effect of the helical compression spring 122, and the sleeve portion 131 begins to protrude into the exhaust gas flow duct 106 until it has reached its pressurized position, in which it at least partly closes the exhaust gas flow duct 106. The pressurized position of the regulating piston 130 is shown in FIG. 6. The supplied pressure medium may for example have a pressure in the range about 0.5-10 bar.

As a result, the pressure rises upstream of the regulating piston 130 (with a certain delay as the gas is compressible). The pressure upstream of the regulating valve is propagated with a certain delay into the exhaust gas pressure chamber 132 via the throttled flow passage 144. Upon approaching a pressure balance between the pressure within the control pressure chamber 164 and the exhaust gas pressure chamber 132, the regulating piston 130 will displace towards the idle position, such that a certain flow of exhaust gas is allowed past the sleeve portion 131. As a result, the pressure upstream of the sleeve portion 131 decreases. Soon a pressure balance will arise and the regulating piston 130 finds a position of equilibrium. The exhaust gas pressure regulator 100 described above is thus self-regulating and automatically provides a backpressure level in similar to the control pressure level.

At the equilibrium position the pressure within the control pressure chamber 164 and the exhaust gas pressure chamber 132, will be approximately the same due to the fact that the effective surface areas of the regulating piston, i.e. the first axial side surface 112 and the second axial side surface 119, are nearly identical, bearing in mind that the pressure exerted by the spring is relatively small.

Figure 7:
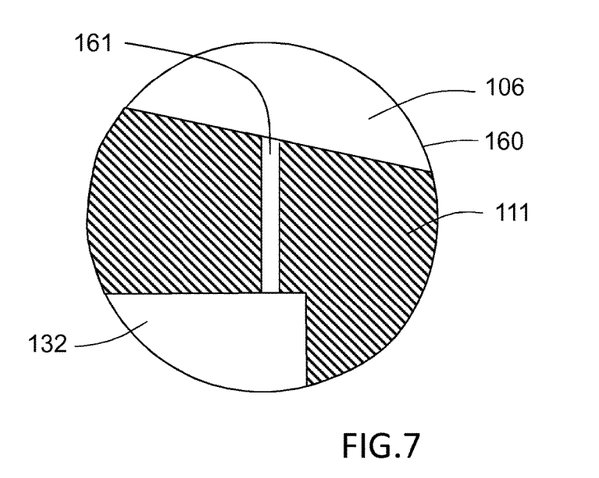
FIG. 7 shows an alternative embodiment of the throttled flow passage.

The solution using the sealing ring 137 for accomplishing the desired calibrated low passage 144 between the gas flow duct 106 and the exhaust gas pressure chamber 132 is advantageous because the flow area of the flow passage can easily be adapted by means of mounting a different piston ring. However, the advantage of the disclosure in terms of increased reliability and reduced damages to the regulator 100 may alternatively be obtained by other means of accomplishing a calibrated flow passage. For example, the front portion 111 of the exhaust gas pressure regulator 100 may be provided with an aperture 161 at an appropriate location for enabling the desired calibrated flow passage 144 between the gas flow duct 106 and the exhaust gas pressure chamber 132, as schematically illustrated in FIG. 7. The size of the aperture 161 is thus relevant for obtaining the desired pressure throttling effect. The aperture may alternatively be provided in the shaft 105 or another part forming a wall of the exhaust gas pressure chamber 132.

Figure 8:
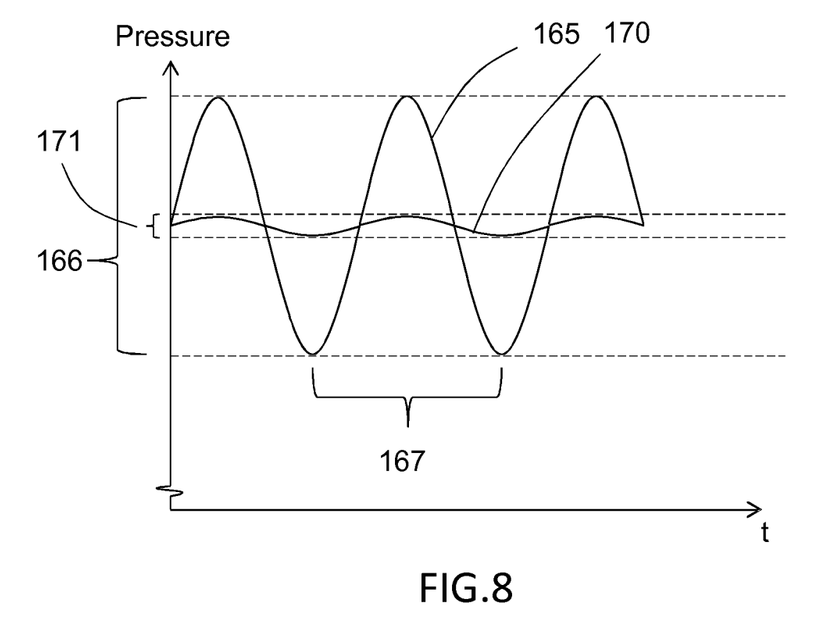
FIG. 8 shows schematic example pressure patterns of the pressure outside and within the exhaust gas pressure chamber.

During for example engine braking the reciprocating motion of the pistons of the combustion engine generates a regular periodical pressure pattern in the exhaust gas flow with a certain frequency. A simplified example of such a regular periodical pressure pattern 165 in the exhaust gas flow is schematically shown in FIG. 8. The pressure pattern may have a certain amplitude 166 and a certain periodical length 167. A real life pressure pattern will most likely have a regular periodical pressure pattern that is less similar to a sinus function.

The regular periodical exhaust gas pressure patterns may coincide or be a multiple of a resonance frequency of the regulating piston 130 and spring 122 assembly in the pressurized position, or an intermediate state between the idle position and pressurized position. Consequently, there is a risk that the regulating piston 130 starts oscillating with a high amplitude at certain engine operating conditions, thereby potentially damaging the regulating piston 130, the spring 122 and/or the nozzle 150 of the regulator 100.

The sensitivity of the regulating piston for being influenced by the periodical pressure pattern can be reduced by reducing the amplitude 166 of the pressure pattern. This may be performed by reducing the effective surface area of the regulating piston 130 that is exposed to the exhaust gas pressure pattern 165. However, simply reducing the effective surface area may result in that the desired self-regulation of the regulating piston is lost or at least impaired.

The solution according to the disclosure includes providing the regulator 100 with an exhaust gas pressure chamber 132 that exhibits about the same average pressure as the exhaust gas pressure pattern 165 but with a reduced amplitude, and having at least a portion of the effective surface area of the regulating piston 130 being exposed to the small amplitude pressure of the exhaust gas pressure chamber 132. Thereby, the amount of effective surface area of the regulating piston 130 that is exposed to the high amplitude exhaust gas pressure pattern 165 is reduced while maintaining the self-regulation functionality of the regulator 100.

Accomplishing an exhaust gas pressure chamber 132 that exhibits about the same average pressure as the exhaust gas pressure pattern 165 but with a reduced amplitude may be performed by providing the inner diffuser assembly 110 with at least one throttled flow passage 144 for enabling pressure equalization of the pressure within the gas flow duct 106 and the exhaust gas pressure chamber 132. The throttled flow passage is configured to filter the large amplitude pressure pattern of the exhaust gas while still allowing an equalizing of the pressure of the gas flow duct 106 and the exhaust gas pressure chamber 132. The filtration and pressure equalization is performed by providing a controlled leakage area between the gas flow duct 106 and the exhaust gas pressure chamber 132. Thereby, large amplitude pressure pattern cannot propagate into the exhaust gas pressure chamber 132 without first losing a certain level of energy (amplitude). However, for avoiding too long delay until pressure equilibrium has been attained after a transient change, the leakage area cannot be too small.

With a proper selected leakage flow the effective piston surface area that is exposed to the high amplitude pressure patterns of the exhaust as may be significantly decreased, depending on the proportion of the effective surface area of the regulating piston being exposed to high amplitude pressure pattern and low amplitude pressure.

In the example embodiment of FIG. 3, the effective surface area of the regulating piston 130 that is exposed to high amplitude pressure pattern of the exhaust gas is shown with dotted force vectors 168, and the effective surface area of the regulating piston 130 that is exposed to low amplitude pressure pattern of the exhaust gas pressure chamber 132 is shown with solid force vectors 169. In the example embodiment of FIG. 3, the proportion of the total amount of effective surface area of the regulating piston that may be exposed to the high amplitude exhaust gas in the exhaust gas flow duct is significantly less 50%.

The term effective surface area of the regulating piston herein refers to the surface of the regulating piston that may induce an axial force on the regulating piston when exposed to a pressure medium.

A schematic and simplified illustration of the pressure pattern 170 within the exhaust gas pressure chamber 132 is illustrated in FIG. 8 for a regulator 100 having a certain leakage flow 144. In this ideal illustration, the amplitude 171 is significantly reduced (dampened) and the average pressure is substantially identical to the average pressure of the gas exhaust flow. The at least one throttled flow passage is thus configured to essentially form a low-pass filter for the dynamic pressure pulsations in the exhaust gas flow duct, where the high frequency pressure variations, such as for example pressure variations having a frequency above 10 Hz, specifically above 1 Hz, are damped. Thereby, the pressure within the exhaust gas pressure chamber 132 will mainly exhibit a low frequency pressure variation, such as for example below 10 Hz, specifically below 1 Hz. Pressure variations with such low frequency may be considered representing mainly the average pressure in the exhaust gas flow duct over a certain time period.

The throttled flow passage may preferably be configured such that a degree of pressure attenuation of the high frequency components, i.e. frequencies above for example 10 Hz, specifically above 1 Hz, of the dynamic pressure pulsations in the exhaust gas flow duct is at least −6 dB, specifically at least −10 dB, and more specifically at least −20 db. The amplitude of the example pressure pattern 170 within the exhaust gas pressure chamber 132 Shown in FIG. 8 is damped with about −20 dB.

As already described briefly, the exhaust gas pressure regulator 100 may preferably be used for braking of a vehicle without necessarily using the friction brakes. When a driver pushes down the brake pedal, a specific braking force is requested. An ECU of the vehicle may then calculate a corresponding air pressure which forces the regulating piston 130 to move, whereby the regulating piston 130 may at least partly close the exhaust gas duct 106 of the exhaust gas pressure regulator 100. For such application, the air pressure may for example be in the range of 1 to 10 Bars, overcoming the spring force as well as the exhaust gas pressure.

In another application, the exhaust gas pressure regulator 100 is used in engine heat mode when it is desired to increase the temperature of the exhaust gas. In such case, an ECU of the vehicle will calculate the desired through flow of exhaust gas for providing the desired temperature, and subsequently apply a corresponding pressure level in the control pressure chamber 164

Although the exhaust gas pressure regulator 100 has been described to operate in series with a turbo-charger unit 50 and a turbo-compound unit 60, it is readily understood that other applications may also be suitable for the proposed exhaust gas pressure regulator 100. Preferably, the presented exhaust gas pressure regulator may be arranged in any application where a radial turbine, e.g. of a turbo-charger unit, is followed by an axial turbine, e.g. of a turbo-compound unit or a further turbo-charger unit. Further, the exhaust gas pressure regulator 100 may be used in association with all kinds of piston engines, from one cylinder and upwards, and with two-stroke or four-stroke engines, for road vehicles, marine equipment, etc. Also, although a pneumatic system for operating the exhaust gas pressure regulator 100 has been described, other means such as mechanical and or hydraulic may also be implemented.

The present invention may be embodied in other specific forms without departing from its spirit or essential characteristics. It is appreciated that various features of the above-described examples can be mixed and matched to form a variety of other alternatives. As such, the described embodiments are to be considered in all respects only as illustrative and not restrictive. The scope of the invention is, therefore, indicated by the appended claims rather than by the foregoing description. All changes that come within the meaning and range of equivalency of the claims are to be included within their scope.

Reference signs mentioned in the claims should not be seen as limiting the extent of the matter protected by the claims, and their sole function is to make claims easier to understand.

The invention claimed is:

1. An exhaust gas pressure regulator for a combustion engine, the regulator comprising a regulator housing and an inner diffuser assembly arranged inside the regulator housing so that an exhaust gas flow duct is formed between an inner surface of the regulator housing and an outer surface of the inner diffuser assembly, wherein the inner diffuser assembly includes a front portion and a regulating piston that is moveable relative to the front portion and the regulator housing between an idle position in which the exhaust gas flow duct is open, and a pressurized position in which the regulating piston at least partly closes the exhaust gas flow duct, wherein the inner diffuser assembly comprises at least one throttled flow passage between the gas flow duct and an exhaust gas pressure chamber defined by the regulating piston and an interior surface of the front portion, wherein the inner diffuser assembly comprises a sealing ring that is configured to partly seal a flow passage between the regulating piston and the front portion of the inner diffuser assembly so that the at least one throttled flow passage is provided by means of a calibrated flow leakage past the sealing ring, and in that the at least one throttled flow passage is configured to form a low-pass filter for dynamic pressure pulsations in the exhaust gas flow duct, wherein the at least one throttled flow passage is configured such that an average pressure level within the exhaust gas pressure chamber corresponds to an average exhaust gas pressure level of an exhaust gas stream at an inlet to the throttled flow passage, and/or a total throttled flow passage is configured such that a degree of pressure attenuation of high frequency components of the dynamic pressure pulsations in the exhaust gas flow duct is at least −6dB.

2. The exhaust gas pressure regulator according to claim 1, wherein a total throttled flow passage of the inner diffuser assembly has a flow area in the range of 0.5-10 mm2.

3. The exhaust gas pressure regulator according to claim 1, wherein a total amount of effective surface area of the regulating piston accessible by exhaust gas in the exhaust gas flow duct for exerting an axial force on the regulating piston towards an outlet of the regulating housing is less than 75% of a total amount of effective surface area of the regulating piston accessible by exhaust gas within the exhaust gas pressure chamber for exerting an axial force on the regulating piston towards the outlet of the regulating housing.

4. The exhaust gas pressure regulator according to claim 1, wherein the front portion is stationary arranged in the regulator housing.

5. The exhaust gas pressure regulator according to claim 1, wherein both an internal cross-sectional area defined by an inner surface of a regulator housing and an outer diameter of the inner diffuser assembly increases in an axial direction towards an outlet of the exhaust gas pressure regulator, and the inner diffuser assembly is arranged concentrically inside the inner surface, of a regulator housing.

6. The exhaust gas pressure regulator according to claim 1, wherein the regulating piston is urged towards the idle position by a force of a mechanical spring device.

7. The exhaust gas pressure regulator according to claim 1, wherein the regulating piston comprises a sleeve portion in sliding contact with an exterior side of the front portion of the inner diffuser assembly, and the sleeve portion (131) protrudes into the exhaust gas flow duct when the regulating piston is in the pressurized position for at least partly closing the exhaust gas flow duct.

8. The exhaust gas pressure regulator according to claim 1, wherein the inner diffuser assembly comprises a stationary shaft, and the regulating piston is slidingly arranged on the shaft.

9. The exhaust gas pressure regulator according to claim 1, wherein the sealing ring is a metal piston ring.

10. The exhaust gas pressure regulator according to claim 9, wherein the metal piston ring in a mounted state has a gap between circumferential ends of the piston ring.

11. The exhaust gas pressure regulator according to claim 10, wherein a circumferential length of an arc-shaped gap between the circumferential ends of the piston ring is in the range of 2-50 mm.

12. The exhaust gas pressure regulator according to claim 1, wherein the exhaust gas pressure regulator further comprises a control pressure chamber defined by the regulating piston, a nozzle unit and a shaft, wherein a pressurized medium within the control pressure chamber is arranged to exert a force on the regulating piston towards the pressurized position.

13. The exhaust gas pressure regulator according to claim 12, wherein the pressure regulator further comprises a pressure medium flow passage for supplying pressurized medium from an outside pressure medium source to the control pressure chamber.

14. The exhaust gas pressure regulator according to claim 1, wherein the front portion of the inner diffuser assembly has a closed end facing an exhaust gas flow inlet of the exhaust gas pressure regulator, and an open end facing an exhaust gas outlet of the exhaust gas pressure regulator, wherein an annular damping member is provided between an axial abutment surface of the regulating piston and an opposite axial abutment surface of the front portion of the inner diffuser assembly for damping impact forces between the regulating piston and the front portion of the inner diffuser assembly.

15. The exhaust gas pressure regulator according to claim 14, wherein the front portion of the inner diffuser assembly has a conical shape with a generally increasing outer diameter in an axial direction from the closed end towards to the open end, and the opposite axial abutment surface of the front portion of the inner diffuser assembly is located in a radially outer region located near or at the open end.

16. The exhaust gas pressure regulator according to claim 14, wherein the annular damping element is a metal textile bushing.

17. An exhaust gas system for an internal combustion engine, wherein the exhaust gas system comprises a gas pressure regulator according to claim 1 located downstream of a first turbine unit and upstream of a second turbine unit.

18. The exhaust gas system according to claim 17, wherein the inner diffuser assembly forms a nozzle for the second turbine unit.

19. The exhaust gas system according to claim 17, wherein the second turbine unit is a turbo-compound unit.

20. The exhaust gas system according to claim 17, wherein the first turbine unit is a turbo-charger unit.

21. A combustion engine comprising an exhaust gas system according to claim 17.

22. A vehicle comprising a combustion engine according to claim 21.

* * * * *